(12) United States Patent
Pierce et al.

(10) Patent No.: US 7,657,889 B2
(45) Date of Patent: Feb. 2, 2010

(54) METHOD, SYSTEM, AND STORAGE MEDIUM FOR SEARCHING MULTIPLE QUEUES FOR PRIORITIZED WORK ELEMENTS

(75) Inventors: Bernard R. Pierce, Poughkeepsie, NY (US); Robert R. Rogers, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 1394 days.

(21) Appl. No.: 10/820,176

(22) Filed: Apr. 6, 2004

(65) Prior Publication Data

US 2005/0222988 A1 Oct. 6, 2005

(51) Int. Cl.
*G06F 9/46* (2006.01)
(52) U.S. Cl. .................................... 718/100
(58) Field of Classification Search ................. 718/100
See application file for complete search history.

(56) References Cited

U.S. PATENT DOCUMENTS

| | | | |
|---|---|---|---|
| 4,807,111 A | 2/1989 | Cohen et al. | |
| 5,187,678 A * | 2/1993 | Hori ........................... | 708/205 |
| 5,333,319 A | 7/1994 | Silen | |
| 5,345,590 A | 9/1994 | Ault et al. | |
| 5,404,563 A | 4/1995 | Green et al. | |
| 5,459,864 A | 10/1995 | Brent et al. | |
| 5,473,773 A | 12/1995 | Aman et al. | |
| 5,555,414 A | 9/1996 | Hough et al. | |
| 5,564,040 A | 10/1996 | Kubala | |
| 5,659,786 A | 8/1997 | George et al. | |
| 5,740,437 A | 4/1998 | Greenspan et al. | |
| 5,758,157 A | 5/1998 | Greenstein et al. | |
| 5,764,895 A | 6/1998 | Chung | |
| 5,784,617 A | 7/1998 | Greenstein et al. | |
| 6,026,448 A | 2/2000 | Goldrian et al. | |
| 6,247,109 B1 | 6/2001 | Kleinsorge et al. | |
| 6,681,282 B1 | 1/2004 | Golden et al. | |
| 6,854,021 B1 | 2/2005 | Schmidt et al. | |
| 6,895,585 B2 * | 5/2005 | Smith .......................... | 718/103 |

(Continued)

OTHER PUBLICATIONS

Distributed Quadtree Processing, Kanade et al, Springer Berlin/Heidelbert, vol. 409, 1990.*

(Continued)

*Primary Examiner*—Meng-Ai An
*Assistant Examiner*—Mengyao Zhe
(74) *Attorney, Agent, or Firm*—Cantor Colburn LLP; William Kinnaman, Jr.

(57) ABSTRACT

A method of searching for work elements for processing in a computing system having a primary queue of work elements and at least one secondary queue of work elements. A numerical priority value is associated with each of the work elements. The method includes setting an initial priority bar and processing work elements from the primary queue until reaching a work element having a priority less than the initial priority bar. A priority bar is set equal to a minimum of a priority limit and a priority on the at least one secondary queue. If the primary queue contains a work element having a priority greater than or equal to the priority bar, then the work element is processed. If the primary queue contains a work element having a priority less than the priority bar, then a work element from the at least one secondary queue is processed.

18 Claims, 8 Drawing Sheets

U.S. PATENT DOCUMENTS

| | | |
|---|---|---|
| 7,010,602 B2 | 3/2006 | Poindexter et al. |
| 7,039,918 B2 | 5/2006 | Jones et al. |
| 7,251,815 B2 | 7/2007 | Donovan et al. |
| 7,281,075 B2 | 10/2007 | Armstrong et al. |
| 7,299,468 B2 | 11/2007 | Casey et al. |
| 2003/0182353 A1 | 9/2003 | Flanigan et al. |
| 2003/0236972 A1 | 12/2003 | Harrington et al. |

OTHER PUBLICATIONS

C. H. Chien et al., "Distributed Quadtree Processing", Design and Implementation of Large Spatial Databases. Springer Berlin/Heidelbert, vol. 409. 1990.

* cited by examiner

METHOD, SYSTEM, AND STORAGE MEDIUM FOR SEARCHING MULTIPLE QUEUES FOR PRIORITIZED WORK ELEMENTS

CROSS-REFERENCE TO RELATED APPLICATION

This application is related to and incorporates integrating processing functions as provided in U.S. patent application Ser. No. 10/820,062 entitled "METHOD, SYSTEM, AND STORAGE MEDIUM FOR MANAGING COMPUTER PROCESSING FUNCTIONS, filed concurrently with this application.

BACKGROUND OF INVENTION

The present invention relates generally to workload management, and in particular, to searching multiple queues for prioritized work elements.

In modern operating systems, the next work element to schedule on a processor should be available without excessive searching of a list of possible work elements that may or may not be ready to use the processor. U.S. Pat. No. 4,807,111 is an example of a queuing discipline that achieves this objective. Unique characteristics of certain processors may dictate that they service a queue of work elements requiring that unique capability to avoid searching the general work queue when the percentage of work elements requiring the capability may be relatively small. An example of this is the management of S390® processors with a vector processor or a cryptographic processor. In the case of the latter, the processors with the cryptographic feature service a processor work queue of elements requiring the cryptographic feature before searching the general work queue.

There may be valid reasons for segregating certain types of work to certain processors for improved performance or for pricing considerations. In the latter case, all processors are capable of servicing the work but only a subset is the primary source of processor for the work. In this case two or more queues of work are populated regularly. If the distribution of work to the queues is not optimal, it would be desirable to have a processor search two or more queues with consideration for priority during the search.

SUMMARY OF INVENTION

An aspect of the invention is a method of searching for work elements for processing in a computing system having a primary queue of work elements and at least one secondary queue of work elements. A numerical priority value is associated with each of the work elements. The method includes setting an initial priority bar and processing work elements from the primary queue until reaching a work element having a priority less than the initial priority bar. A priority bar is set equal to a minimum of a priority limit and a priority on the at least one secondary queue. If the primary queue contains a work element having a priority greater than or equal to the priority bar, then the work element is processed. If the primary queue contains a work element having a priority less than the priority bar, then a work element from the at least one secondary queue is processed.

Another aspect of the invention is a system for searching queued work elements for processing. The system includes a primary queue of work elements, a numerical priority value being associated with each of the work elements. The system further includes at least one secondary queue of work elements, a numerical priority value being associated with each of the work elements. A processor is in communication with the primary queue and the at least one secondary queue. The processor sets an initial priority bar and processes work elements from said primary queue until reaching a work element having a priority less than the initial priority bar. The processor sets a priority bar equal to a minimum of a priority limit and a priority on the at least one secondary queue. If the primary queue contains a work element having a priority greater than or equal to the priority bar, the processor processes the work element. If the primary queue contains a work element having a priority less than the priority bar, the processor processes a work element from the at least one secondary queue.

Another aspect of the invention is a storage medium encoded with machine-readable computer program code for searching queued work elements for processing a primary queue of work elements and at least one secondary queue of work elements. A numerical priority value is associated with each of said work elements. The storage medium includes instructions for causing a processor to perform a process that includes setting an initial priority bar and processing work elements from the primary queue until reaching a work element having a priority less than the initial priority bar. A priority bar is set equal to a minimum of a priority limit and a priority on the at least one secondary queue. If the primary queue contains a work element having a priority greater than or equal to the priority bar, then the work element is processed. If the primary queue contains a work element having a priority less than the priority bar, then a work element from the at least one secondary queue is processed.

BRIEF DESCRIPTION OF DRAWINGS

Referring to the exemplary drawings wherein like elements are numbered alike in the several FIGURES.

DETAILED DESCRIPTION

Figure 1:
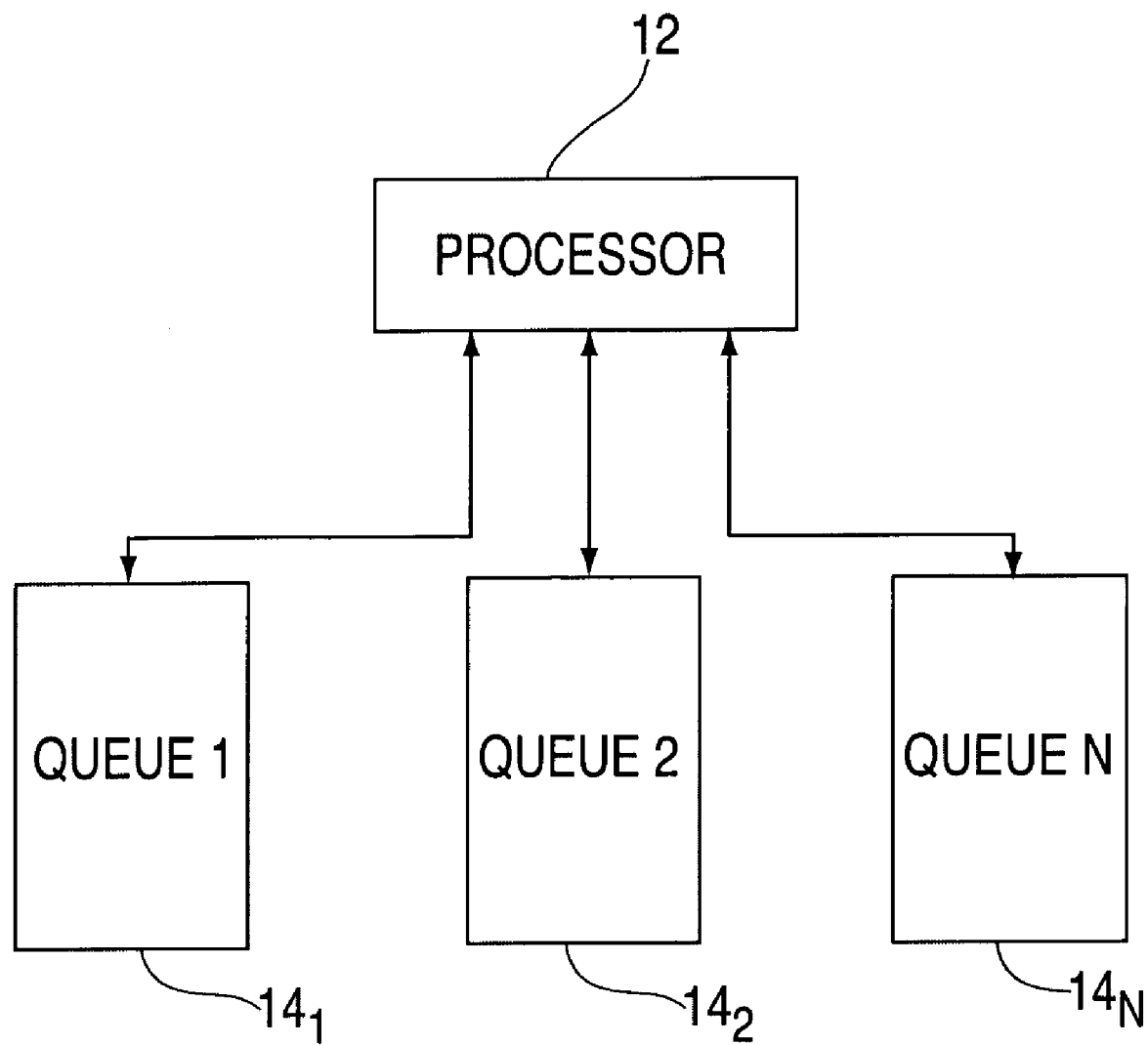
FIG. 1 is a diagram of an exemplary system for prioritizing work elements across a plurality of queues.

FIG. 1 is a block diagram of a system for prioritizing work elements across multiple queues. The system includes a processor 12 in communication with multiple queues 14. Processor 12 may be implemented using many types of devices. For example, processor 12 may be a microprocessor executing instruction streams represented by elements of work buffered in queues 14. In other embodiments, processor 12 is a database manager accessing data elements from queues 14. Thus, the term processor is not limited to microprocessors, but includes a variety of devices processing work elements from queues 14. The queues may be arranged in a hierarchy of preference such that queue $14_1$ is a primary queue, queue $14_2$ is a secondary queue and queue $14_3$ is a tertiary queue. Work elements in the queues are arranged in order of priority, from high to low. The priority may be represented with a numerical value, with either a high or low numerical value indicating a high priority. The processor 12 operates in response to a computer program contain in a storage medium accessible by processor 12.

Figure 2:
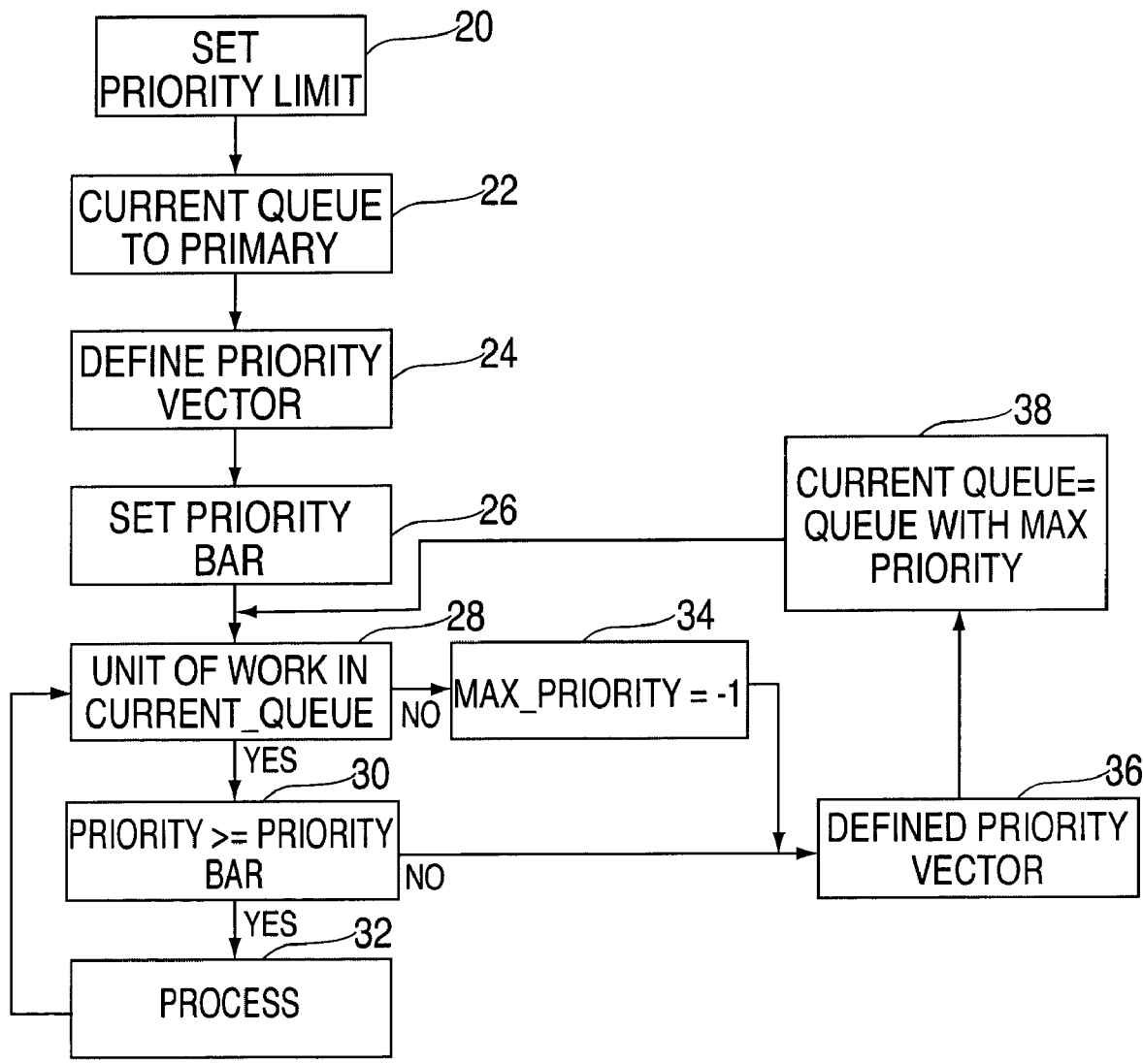
FIG. 2 is a flowchart of an exemplary process for prioritizing work elements across a plurality of queues.

FIG. 2 is a flowchart of a process for prioritizing work elements across multiple queues. The process begins at step 20 where a priority limit is set. The priority limit indicates a priority of elements on the primary queue $14_1$ that must be reached before the elements of the secondary queue $14_2$ are eligible to be processed. Before searching the primary queue $14_1$, the other queues $14_2$ and $14_3$ are accessed. As part of the initialization, the primary queue is designated the current queue at step 22.

At step 24 a priority vector is generated containing the maximum priority value for each of the queues $14_1$-$14_3$. Each queue is accessed by processor 12 at this time to determine the maximum priority work element in each queue. Initially, the vector value for the primary queue is set to 0. In the present example, the priority vector is (0,max_prty$_2$, max_prty$_3$). Once the priority vector is created, a priority bar is determined at step 26. The priority bar is determined based on the minimum of the priority limit and the maximum value in the priority vector. Represented mathematically, the priority bar equals minimum(priority limit, maximum(priority vector)).

At step 28, the current queue is searched to find a work element to be processed. If a work element is found, flow proceeds to step 30 where it is determined if the priority of the work element is greater than or equal to the priority bar. If so, the work element is processed at step 32 and flow returns to step 28.

If no work element is found in the current queue (i.e., initially the primary queue) at step 28, the flow proceeds to step 34 where the maximum priority for the current queue is set to −1. This prevents an empty queue from being considered in the search of queues and optimizes the processing. Flow then proceeds to step 36 where the priority vector is re-defined. Further, if the work element considered at step 30 has a priority lower than the priority bar, this indicates that the work element should not be processed as its priority is not sufficient. Flow proceeds to step 36 where the priority vector is re-defined.

At step 36, the priority vector is updated with the maximum priority values for the current queue and is represented as (max_prty$_1$, max_prty$_2$, max_prty$_3$). Flow proceeds to step 38 where the current queue is defined as the queue having the maximum priority value. Flow proceeds to step 28 to search the new queue.

Figure 3:
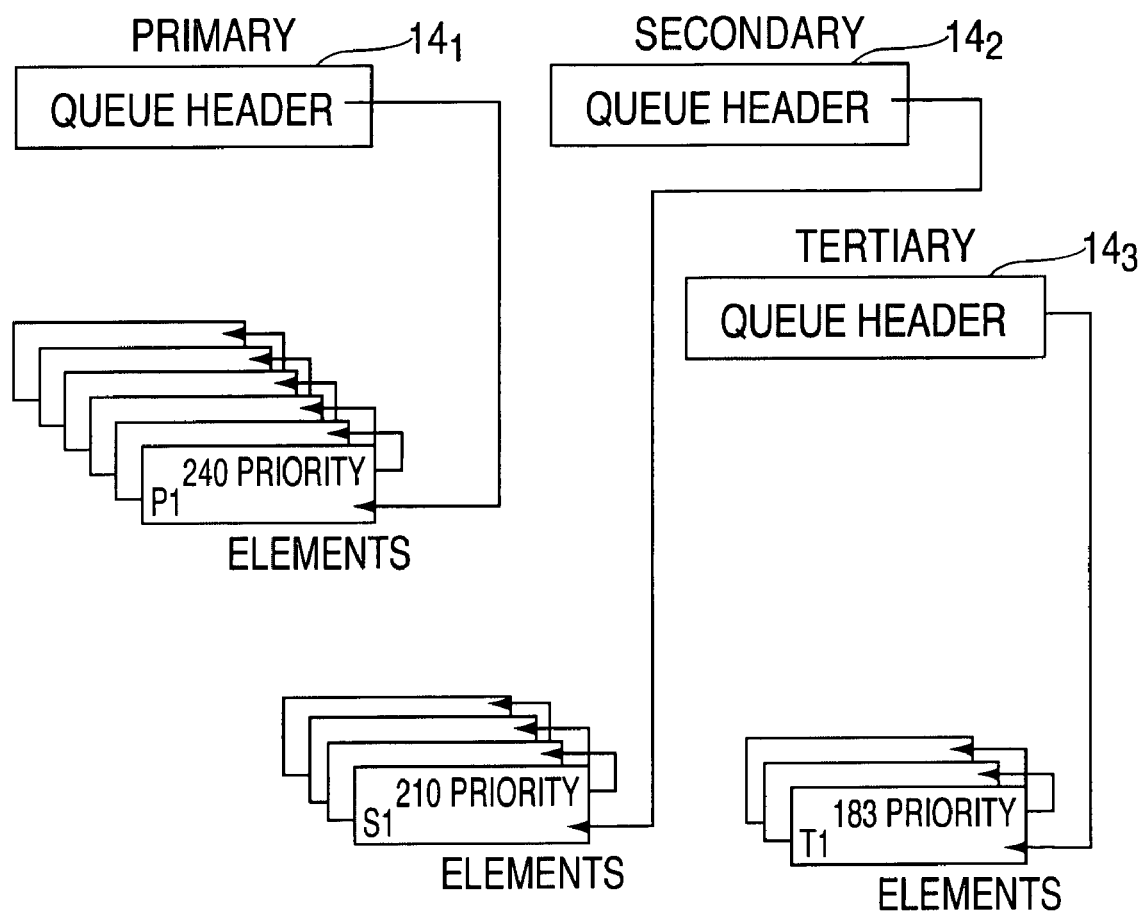
FIG. 3 depicts three exemplary queues.
Figure 4:
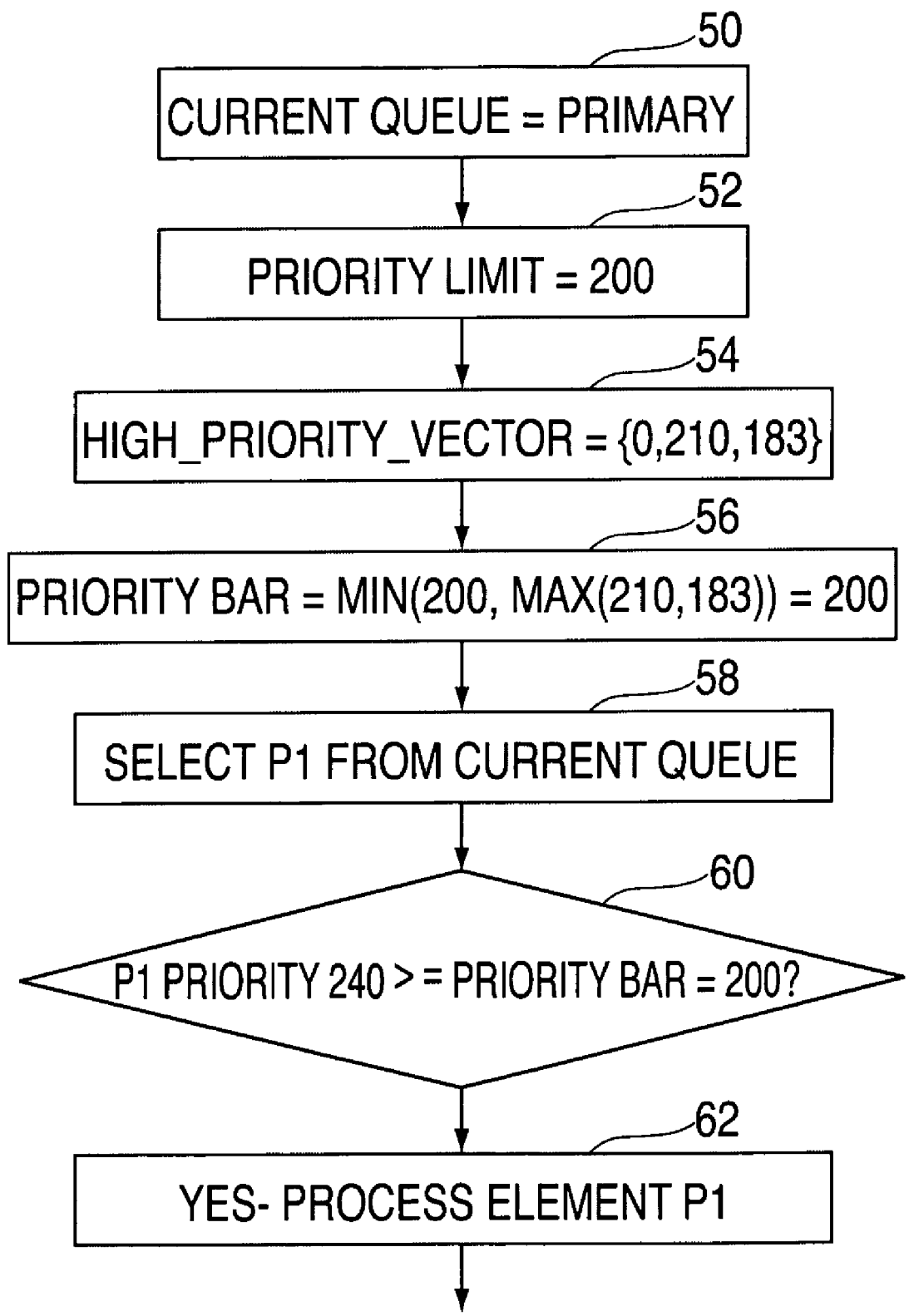
FIG. 4 depicts the prioritization of the queues of FIG. 3.

FIG. 3 depicts primary queue $14_1$, secondary queue $14_2$ and tertiary queue $14_3$ in one example. FIG. 4 depicts the processing of work elements in these queues. At step 50 the current queue is set to the primary queue and the priority limit is set to 200 at step 52. At step 54 the priority vector is defined using 0 for the primary queue priority value and the maximum priority values from the secondary and tertiary queues, 210 and 183 respectively.

At step 56, the priority bar is determined as described above and is set at 200. At step 58, a work element is retrieved from the primary queue $14_1$ and the priority of the work element is compared to the priority bar. Since the priority of the unit of work, 240, is greater than the priority bar, 200, the unit of work, referenced as P1 is processed at step 62.

Figure 5:
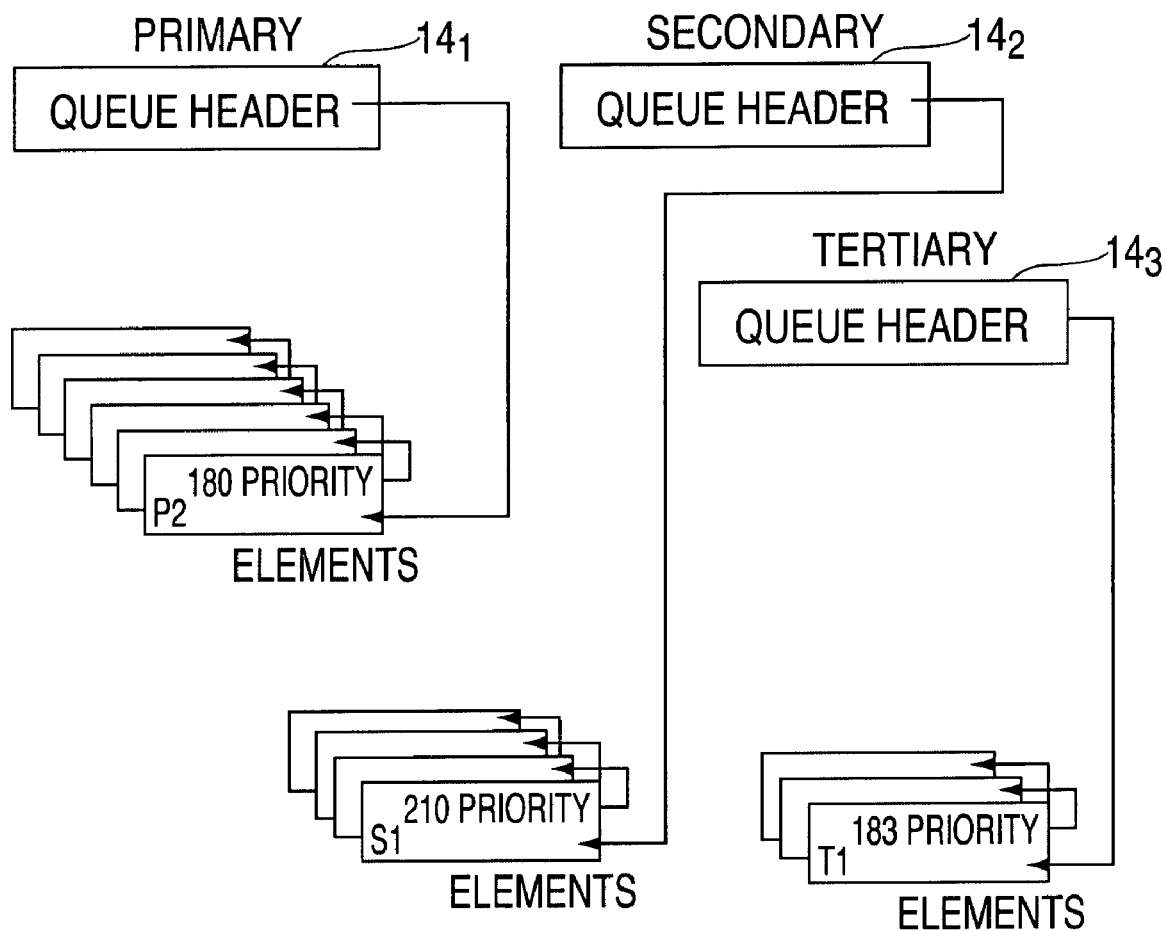
FIG. 5 depicts three exemplary queues.
Figure 6A:
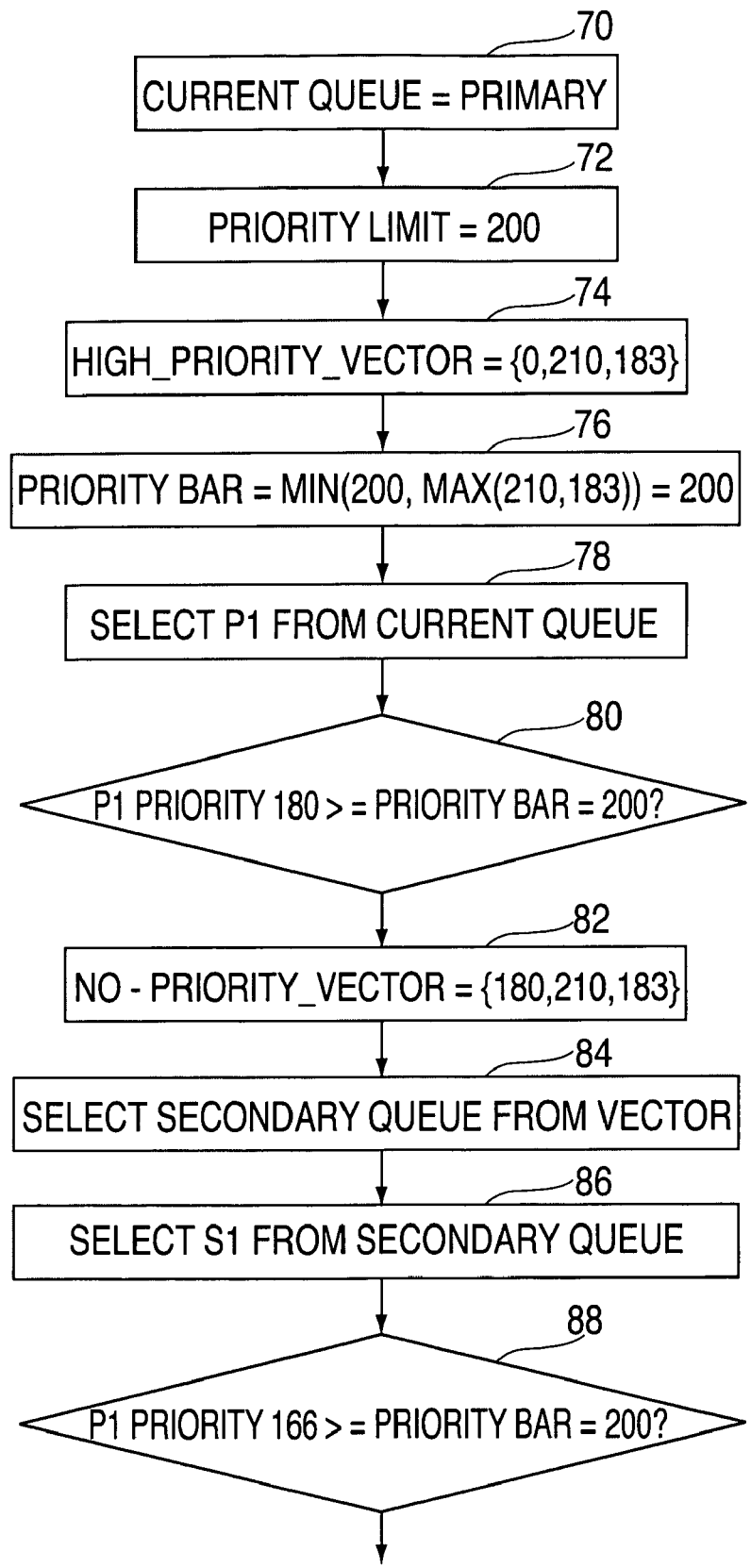
FIGS. 6A and 6B depict the prioritization of the queues of FIG. 5.
Figure 6B:
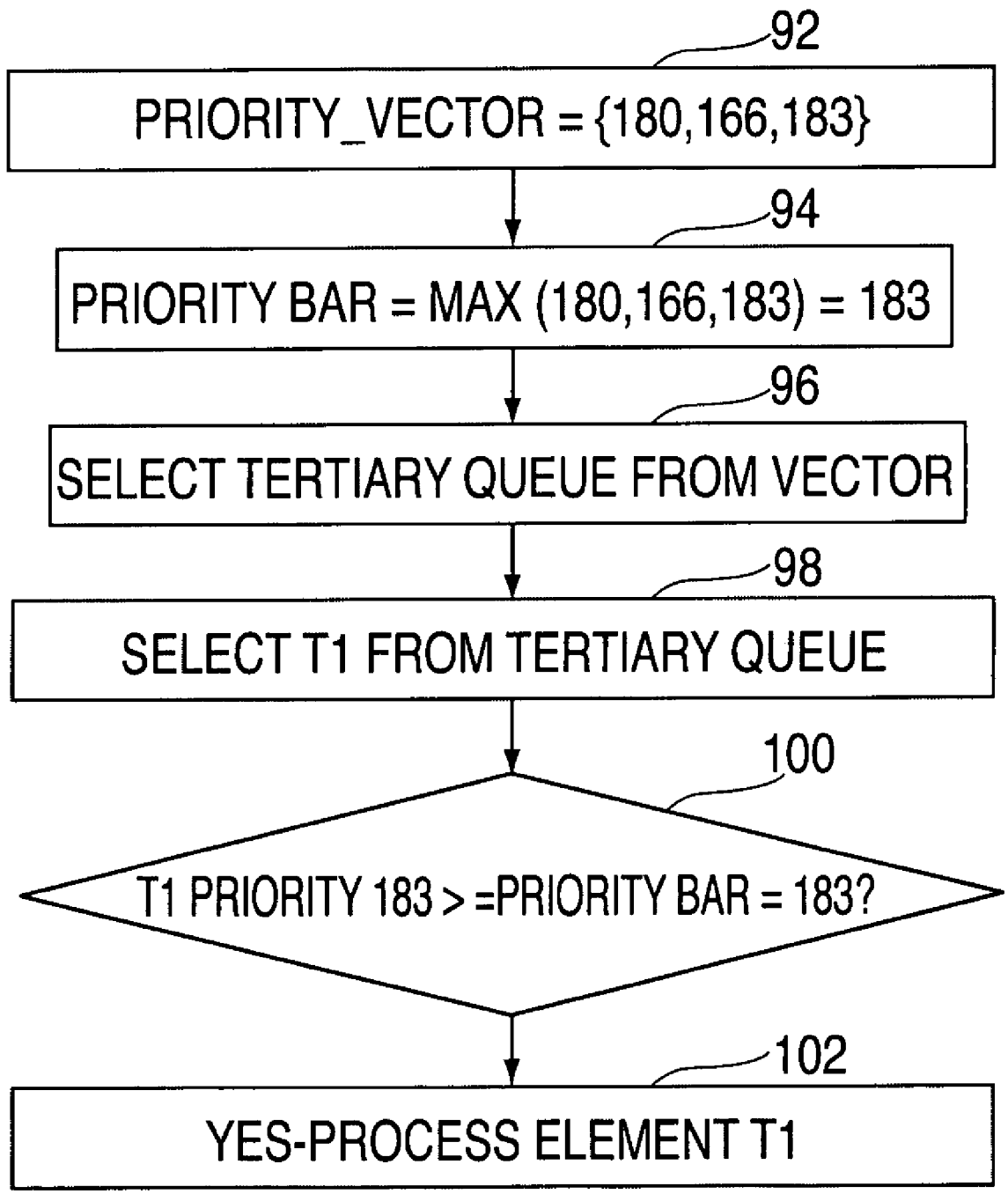

FIG. 5 depicts the primary queue $14_1$, secondary queue $14_2$ and tertiary queue $14_3$ in another example. FIGS. 6A and 6B are a flowchart depicting the processing of work elements in these queues. At step 70, the current queue is set to the primary queue $14_1$ and the priority limit is set to 200 at step 72. As described previously, the priority vector is defined at step 74 using 0 for the primary queue priority value. At step 76 the priority bar is redefined as the minimum of the priority limit and the maximum value in the priority vector. Represented mathematically, the priority bar equals minimum(priority limit, maximum(priority vector)).

At step 78, a work element is selected from the current queue and the priority of the work element is compared to the priority bar at step 80. As the priority of the work element is not greater than or equal to the priority bar, the work element is not processed and a new priority vector is derived as shown at step 82. The new priority vector is defined based on the maximum priority values from each of the queues. The processor 12 stores the previously retrieved maximum priority values for queues $14_2$ and $14_3$ so that these queues need not be accessed again to redefine the priority vector.

At step 84, a work element is retrieved from another queue, is this case the secondary queue $14_2$ is defined as the current queue. The determination of the new current queue may be based on the hierarchical arrangement of the queues (e.g., secondary always checked before tertiary). Alternatively, the determination of the current queue may be based on the queue having a work element having the maximum priority value of the remaining queues. At step 86, a work element is retrieved from the current queue (i.e., secondary queue $14_2$), and the priority of the work element is compared to the priority bar at step 88. It is noted that the priority of the work element in secondary queue 142 has changed from 210 to 166 as a result of another processor accessing the work element having priority 210. Again, the priority bar is defined as the as the minimum of the priority limit and the maximum value in the priority vector.

As shown at step 88, the highest priority work element in the secondary queue $14_2$ has a priority less than the priority bar. Flow proceeds to step 92 where the priority vector is redefined based on the highest priority values in each of the queues. As shown in step 92, the maximum priority work unit from secondary queue $14_2$ has changed from 210 to 166, as another processor has accessed and processed the work element having the priority 210. At step 94, the priority bar is established based on the maximum priority value across all queues, without considering the priority limit. It is noted that in alternate embodiments, the priority limit may be used as described in step 76.

At step 96, the tertiary queue is defined as the new current queue and a unit of work, T1, is selected from the tertiary queue $14_3$ at step 98. At step 100, the priority of the work element from the tertiary queue is compared to the priority bar. Since the priority of the work element is greater than or equal to the priority bar, the work element T1 is processed at 102.

As described above, embodiments of the invention allow work elements to be prioritized across multiple queues. The priority value has been described as a high number for a high priority, but a converse relationship may be used where a low number corresponds to a high priority. The priority scheme optimizes the search of the primary queue since the priority bar allows continuing as necessary on the primary queue until a priority is reached that is less than the priority bar, at which time the primary queue search is stopped and the secondary queue(s) are searched. If the priority limit is set to the lowest priority recognized in the system, it would effectively stop selection of elements from any alternate queue(s) until all elements on the primary queue were selected. On the other hand, if the priority limit were set to the highest priority recognized in the system, the selection across the queues would be in priority order with the only bias being the order of the queues (i.e., primary, secondary, tertiary). If the priorities of elements are set by relatively static rules by an administrator, the priority limit could also be set to a relatively static value. In alternate embodiments, the priority limit may be programmatically set based on observed results in a goal oriented management system such as the workload manager (WLM) of zOS® operating system.

The priority management aspects of the invention may be incorporated into a goal oriented management system such as WLM as described by IBM U.S. Pat. No. 5,473,773. The goal oriented manager can set the priority limit based on the available resources and the goals without the need for other means to set the limits. The priority limit may be set by some other means such as a static setting via some other source.

Figure 7:
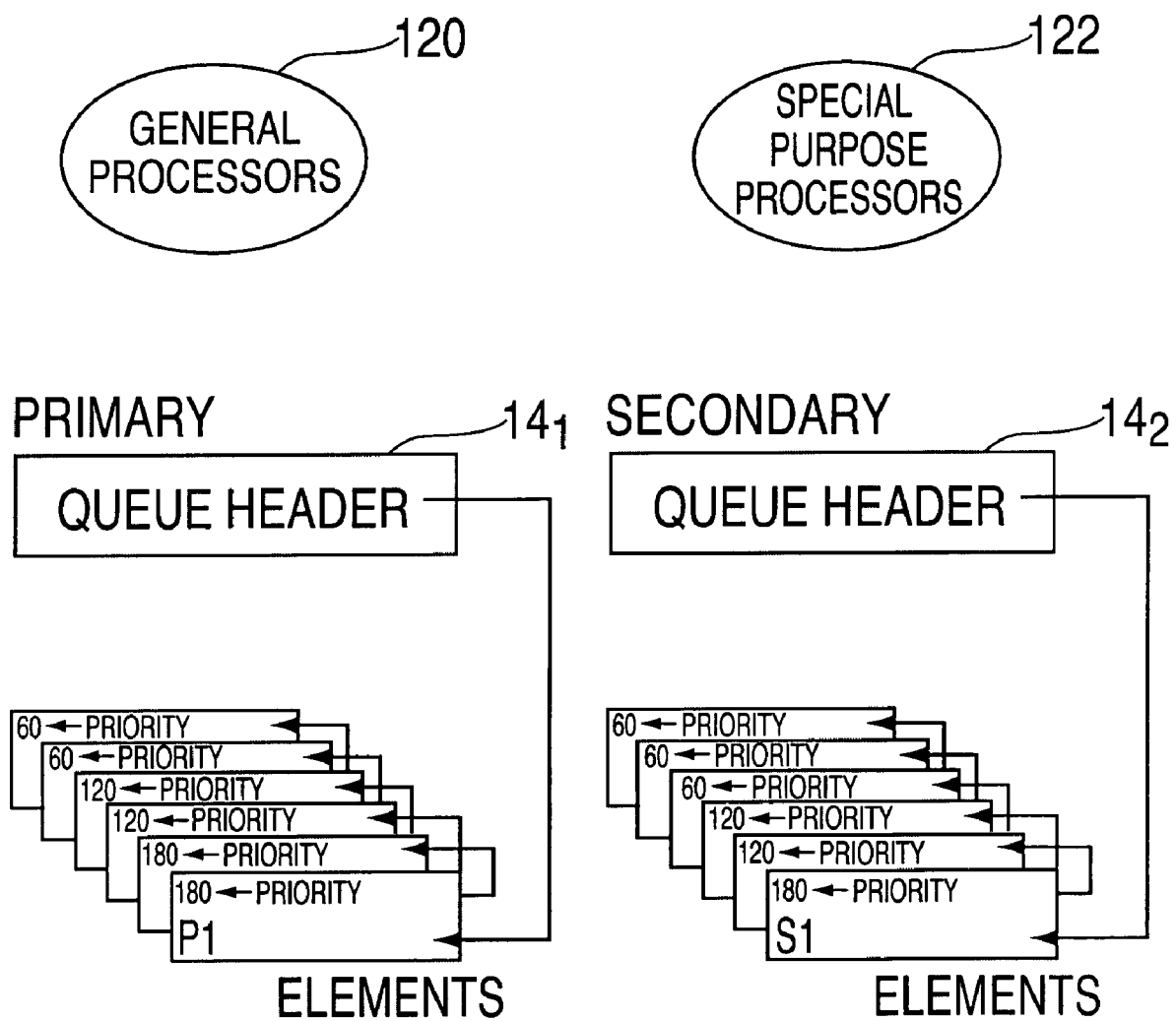
FIG. 7 depicts prioritization of work elements in a system having general processors and special purpose processors.

FIG. 7 depicts prioritization of work elements in a system having general processors and special purpose processors. Queue $14_1$ contains general work elements and queue $14_2$ contains special purpose work elements (e.g., Java work elements). The system includes general purpose processors 120 that process general work elements and special purpose work elements. Special purpose processors 122 process only special purpose work elements in queue $14_1$. In the example shown in FIG. 7, the priority limit is set to 60. This causes general processors 120 to ignore higher priority elements with priorities 180 and 120 in the special purpose queue $14_2$. The limit keeps the less plentiful processors from processing high priority work that can be done by special processors until the general processors reach discretionary work at which point the general processors process general and special work in priority order.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method of searching for work elements for processing in a computing system having a primary queue of work elements and at least one secondary queue of work elements, a numerical priority value being associated with each of said work elements, the method comprising:

setting a priority bar to an initial value;

processing work elements from said primary queue until reaching a work element having a priority less than said initial priority bar;

setting the priority bar equal to a minimum of a priority limit and a highest priority of work elements left on said primary queue and a highest priority of work elements in said at least one secondary queue;

if said primary queue contains a work element having a priority greater than or equal to said priority bar, processing said work elements;

if said primary queue contains a work element having a priority less than said priority bar, processing a work element from said at least one secondary queue.

2. The method of claim 1 wherein:

said work elements are arranged in each of said primary queue and said at least one secondary queue in descending priority order.

3. The method of claim 1 wherein:

determining said initial value of said priority bar is determined based on the priority limit and a priority vector.

4. The method of claim 3 wherein:

said priority vector is determined based on the highest priority work elements in said at least one secondary queue.

5. The method of claim 4 wherein:

a priority value in said priority vector for said primary queue is initially set to zero in determining the initial value of the priority bar.

6. The method of claim 1 further comprising:

if said primary queue has no work elements, setting a maximum priority value for said primary queue to −1.

7. A system of searching for queued work elements for processing, the system comprising:

a primary queue of work elements, a numerical priority value being associated with each of said work elements;

at least one secondary queue of work elements, a numerical priority value being associated with each of said work elements, a processor in communication with said primary queue and said at least one secondary queue, said processor implementing:

setting a priority bar to an initial value;

processing work elements from said primary queue until reaching a work element having a priority less than said initial priority bar;

setting the priority bar equal to a minimum of a priority limit and a highest priority of work elements left on said primary queue and a highest priority of work elements in said at least one secondary queue;

if said primary queue contains a work element having a priority greater than or equal to said priority bar, processing said work elements;

if said primary queue contains a work element having a priority less than said priority bar, processing a work element from said at least one secondary queue.

8. The system of claim 7 wherein:

said work elements are arranged in each of said primary queue and said at least one secondary queue in priority order.

9. The system of claim 7 wherein: said processor determining said initial value of said priority bar is based on the priority limit and a priority vector.

10. The system of claim 9 wherein:

said priority vector is determined based on the highest priority work elements in said primary queue and said at least one secondary queue.

11. The system of claim 10 wherein:
said processor initially sets a priority value in said priority vector for said primary queue to zero in determining the initial value of the priority bar.

12. The system of claim 7 further comprising:
if said primary queue has no work elements, said processor setting a maximum priority value for said primary queue to −1.

13. A storage medium encoded with machine-readable computer program code for searching for queued work elements for processing a primary queue of work elements and at least one secondary queue of work elements, a numerical priority value being associated with each of said work elements, said storage medium including instructions for causing a processor to perform:
  setting a priority bar to an initial value;
  processing work elements from said primary queue until reaching a work element having a priority less than said initial priority bar;
  setting the priority bar equal to a minimum of a priority limit and a highest priority of work elements left on said primary queue and a highest priority of work elements in said at least one secondary queue;
  if said primary queue contains a work element having a priority greater than or equal to said priority bar, processing said work elements;
  if said primary queue contains a work element having a priority less than said priority bar, processing a work element from said at least one secondary queue according to priority values in said at least one secondary queue.

14. The storage medium of claim 13 wherein:
said work elements are arranged in each of said primary queue and said at least one secondary queue in priority order.

15. The storage medium of claim 13 wherein: determining said initial value of said priority bar is determined based on the priority limit and a priority vector.

16. The storage medium of claim 15 wherein:
said priority vector is determined based on the highest priority work elements in said at least one secondary queue.

17. The storage medium of claim 16 wherein:
a priority value in said priority vector for said primary queue is initially set to zero in determining the initial value of the priority bar.

18. The storage medium of claim 13 further comprising instructions for causing said processor to perform:
  if said primary queue has no work elements, setting a maximum priority value for said primary queue to −1.

* * * * *

UNITED STATES PATENT AND TRADEMARK OFFICE

CERTIFICATE OF CORRECTION

PATENT NO. : 7,657,889 B2  Page 1 of 1
APPLICATION NO. : 10/820176
DATED : February 2, 2010
INVENTOR(S) : Pierce et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1702 days.

Signed and Sealed this

Thirtieth Day of November, 2010

David J. Kappos
*Director of the United States Patent and Trademark Office*